United States Patent

Takahashi et al.

[11] Patent Number: 5,483,280
[45] Date of Patent: Jan. 9, 1996

[54] ARRANGEMENT FOR CONTROLLING AN IRIS TO REGULATE LIGHT IN AN OPTICAL SYSTEM

[75] Inventors: Yoshikazu Takahashi; Toshiaki Isogawa, both of Kanagawa; Yutaka Satoh, Tokyo; Shuji Shimizu, Kanagawa, all of Japan

[73] Assignee: Sony Corporation, Tokyo, Japan

[21] Appl. No.: 320,376

[22] Filed: Oct. 11, 1994

Related U.S. Application Data

[63] Continuation of Ser. No. 028810, Mar. 19, 1993, abandoned.

[30] Foreign Application Priority Data

Mar. 11, 1992 [JP] Japan ..................... 4-052776

[51] Int. Cl.[6] ................................. H04N 5/238
[52] U.S. Cl. ............................ 348/296; 348/363
[58] Field of Search ..................... 348/207, 224, 348/296, 298, 362, 363, 364, 367, 368; H04N 5/335, 5/238

[56] References Cited

U.S. PATENT DOCUMENTS

| | | | |
|---|---|---|---|
| 4,890,166 | 12/1989 | Kimura et al. | 358/228 |
| 4,984,088 | 1/1991 | Tani et al. | 358/228 |
| 5,049,997 | 9/1991 | Arai | 358/213.11 |
| 5,081,535 | 1/1992 | Kondo et al. | 358/228 |
| 5,083,209 | 1/1992 | Inoue et al. | 348/296 |
| 5,087,978 | 2/1992 | Hieda | 358/228 |
| 5,115,319 | 5/1992 | Arai et al. | 358/228 |
| 5,148,281 | 9/1992 | Nakamura et al. | 358/228 |
| 5,157,502 | 10/1992 | Nakajima et al. | 358/213.19 |
| 5,299,015 | 3/1994 | Imaide et al. | 348/229 |

FOREIGN PATENT DOCUMENTS

| | | | |
|---|---|---|---|
| 0393401 | 10/1990 | European Pat. Off. | H04N 5/238 |
| 0466929 | 10/1990 | European Pat. Off. | H04N 238 |

*Primary Examiner*—Wendy R. Greening
*Attorney, Agent, or Firm*—Hill, Steadman & Simpson

[57] ABSTRACT

A light amount control apparatus including an iris (2) for adjusting an amount of a light from a lens (1) and supplying the adjusted light amount to a CCD element (3), an iris driving unit (9) for driving the iris (2), an iris position detecting unit (10) for detecting an aperture value of the iris (2), a shutter driving unit (8), and a microcomputer (11) for controlling the iris (2) through the shutter driving unit (8) and the iris driving unit (9). The aperture value of the iris (2) can be prevented from being increased after the position of the iris (2) detected by the iris position detecting unit (10) is located a little ahead of the position at which a diffraction phenomenon occurs. After the iris position detecting unit is located a little ahead of the position at which the diffraction phenomenon occurs, the aperture value of the iris (2) can be prevented from being increased. Therefore, when the cameraman takes a picture of bright scene, for example, even if the iris is closed considerably, the diffraction phenomenon can be prevented and a satisfactory shooting can be effected.

6 Claims, 5 Drawing Sheets

& nbsp;
ARRANGEMENT FOR CONTROLLING AN IRIS TO REGULATE LIGHT IN AN OPTICAL SYSTEM This is a continuation, of application Ser. No. 08/028,810, filed Mar. 10, 1992, now abandoned.

BACKGROUND OF THE INVENTION

1. Field of the Invention

The present invention relates to a light amount control apparatus for use in a video camera or the like.

2. Description of the Related Art

In a video camera having CCD (charge-coupled device) elements, a light from an object is radiated through an optical lens onto an image pickup screen. The light from the object is photoelectrically converted into an electrical signal and the electrical signal is read out from the CCD element as a video signal by a read control signal from a read circuit. The video signal is corrected in shading and in various levels and then processed in a suitable signal processing fashion. Then, the thus processed video signal is output.

In such video camera, a light amount from the object is automatically adjusted and supplied to the CCD elements by a so-called auto iris mechanism. When the cameraman takes a picture of very bright scene, there is then the possibility that the iris is closed to the extent that an optical diffraction phenomenon will occur. Therefore, when the cameraman takes a picture of a scene brighter than the brightness corresponding to the position that the iris causes the above optical diffraction phenomenon, an ND (neutral density) filter that reduces a brightness is mounted on the video camera or the video camera is operated in the shutter priority mode where the shutter operation has a priority. Therefore, a sensitivity is intentionally reduced by the cameraman by a so-called electronic shutter which can vary an electric charge accumulation time in the CCD element.

When the ND filter is attached to the video camera in use or the electronic shutter is utilized intentionally, the user must attach or detach the ND filter to and from the video camera and also the user must determine whether or not the electronic shutter should be utilized. This is very cumbersome for the user.

However, if the ND filter is not utilized or the electronic shutter is not utilized when the cameraman takes a picture of such bright scene, a resolution is deteriorated due to an optical diffraction phenomenon. There is then the disadvantage that the cameraman cannot take a picture satisfactorily.

This phenomenon becomes remarkable when the sensitivity of the CCD element is increased. In order to solve the above problem, there is no other way than attaching the ND filter to the video camera or intentionally using the electronic shutter that is expected in other purpose.

OBJECTS AND SUMMARY OF THE INVENTION

Therefore, it is an object of the present invention to provide a light amount control apparatus in which the aforesaid shortcomings and disadvantages encountered with the prior art can be eliminated.

More specifically, it is an object of the present invention to provide a light amount control apparatus in which an optical diffraction phenomenon can be prevented when a cameraman takes a picture of a bright scene.

It is another object of the present invention to provide a light amount control apparatus in which a cameraman can takes a picture in response to an aperture value of an iris.

It is a further object of the present invention to provide a light amount control apparatus in which a cameraman can take a picture satisfactorily.

According to an aspect of the present invention, there is provided a light amount control apparatus for controlling an amount of a light from an optical system which comprises an iris for adjusting an amount of a light from an optical system and supplies an adjusted light amount to an image pickup element, a driving circuit for driving the iris, a detecting circuit for detecting an aperture value of the iris, a shutter, and an iris control circuit for controlling the iris through the shutter and the driving circuit so that the aperture value of the iris can be prevented from exceeding a predetermined value when the aperture value of the iris detected by the detecting circuit exceeds the predetermine value.

According to a second aspect of the present invention, there is provided an imaging apparatus in which a light from an object is focused through an optical system to a target screen of an image pickup element and a light focused on the image pickup element is photoelectrically converted to obtain a video signal. This apparatus comprises an iris for adjusting an amount of a light from the optical system and supplying the adjusted light amount to the image pickup element, an iris control circuit for detecting an amplitude of the video signal from the image pickup element and driving the iris in response to the amplitude value of the video signal to control an aperture value of the iris, an aperture value detecting circuit for detecting the aperture value of the iris, a shutter for supplying a signal corresponding to an accumulation time of an electric charge accumulation control signal to the image pickup element, and a shutter control circuit for controlling the shutter so that the accumulation time of the electric charge accumulation control signal of the image pickup element is made constant by the shutter until the aperture value of the iris detected by the aperture value detecting circuit becomes a predetermined value and that the accumulation time of the electric charge accumulation control signal of the image pickup element is reduced by the shutter and the aperture value of the iris can be prevented from exceeding the predetermined value when the aperture value of the iris detected by the aperture value detecting circuit becomes a predetermined value.

In accordance with a third aspect of the present invention, there is provided a light amount control method for controlling an amount of a light from an optical system which comprises the steps of aperture value detecting step for detecting an aperture value of an iris, an aperture value comparing step for comparing the aperture value of the iris detected in the aperture value detecting step with a predetermined value of an aperture value, and an iris control step for controlling the iris through shutter means and driving means so that the aperture value of the iris can be prevented from exceeding a predetermined value when the aperture value of the iris detected at the aperture value detecting step becomes the predetermined value.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

A light amount control apparatus according to an embodiment of the present invention will hereinafter be described with reference to FIG. 1.

Figure 1:
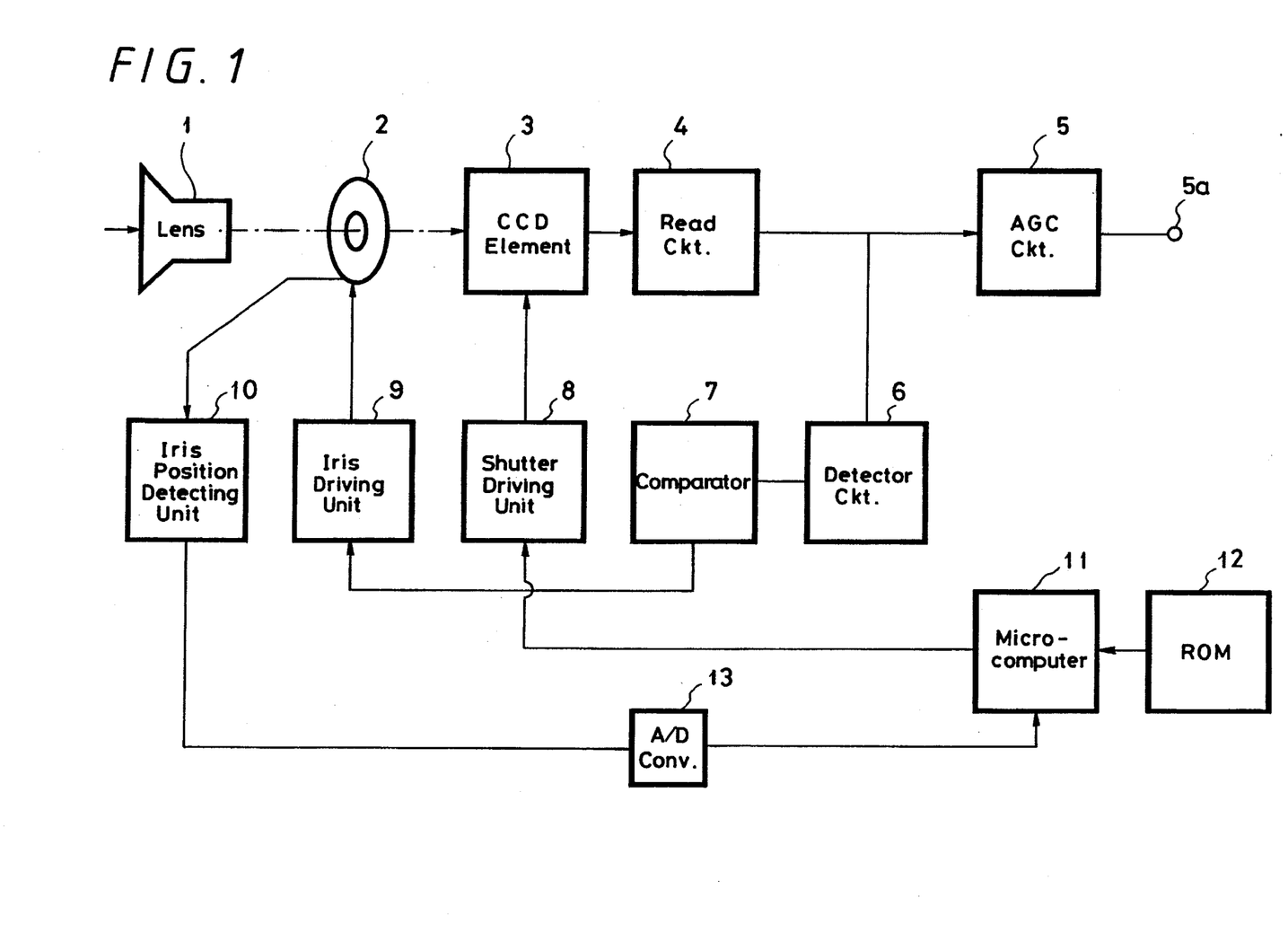
FIG. 1 is a block diagram showing a light amount control apparatus according to an embodiment of the present inven

As shown in FIG. 1 of the accompanying drawings, a light of an object is supplied from a lens 1 through an iris 2 to a CCD device 3. An amount of light from the lens 1 is adjusted by the iris 2 in response to a drive signal from an iris driving unit 9.

An aperture amount (hereinafter referred to as an aperture value) of the iris 2 that is driven by the drive signal from the iris driving unit 9 is detected by an iris position detecting unit 10. A detected signal from the iris position detecting unit 10 is converted into a digital signal by an A/D (analog-t-digital) converter 13 and the digital signal is supplied to a microcomputer 11.

The microcomputer 11 compares aperture value data (aperture value provided a little before the diffraction phenomenon occurs) from a ROM (read only memory) 12 such as an EEPROM (electrically erasable and programmable ROM) or the like and aperture value data supplied thereto from the iris position detecting unit 10 through the A/D converter 13. On the basis of the compared result, the microcomputer 11 controls a shutter driving unit 8. The shutter driving unit 8 changes a signal corresponding to an accumulation time of an electric charge accumulation control signal supplied to the CCD device 3 on the basis of the control signal from the microcomputer 1. In this case, if the ROM 12 is formed of a writable memory such as the EEPROM, then it becomes possible to freely set aperture values at which the diffraction phenomenon occurs in video cameras using different kinds of and different types of CCD image pickup devices, lenses and irises.

An electric charge accumulated in the CCD device is read out by a read circuit 4 to provide a video signal. This video signal is supplied to an AGC (automatic gain control) circuit 5 and a detecting circuit 6. In the AGC circuit 5, a gain is given to the video signal read by the read circuit 4. Then, this video signal is supplied through an output terminal 5a to a video camera body circuit (not shown).

The detecting circuit 6 detects the video signal read by the read circuit 4 to detect the level thereof and supplies the detected signal to a comparator 7. The comparator 7 compares the level represented by the detected signal from the detecting circuit 6 and an inside reference level. The comparator 7 supplies a control signal to the iris driving unit 9 on the basis of the compared result so that the aperture value of the iris 2 is controlled through the iris driving circuit 9.

Examples of structures of the iris 2 and the iris position detecting unit 10 will be described with reference to FIGS. 2 and 3.

Figure 2:
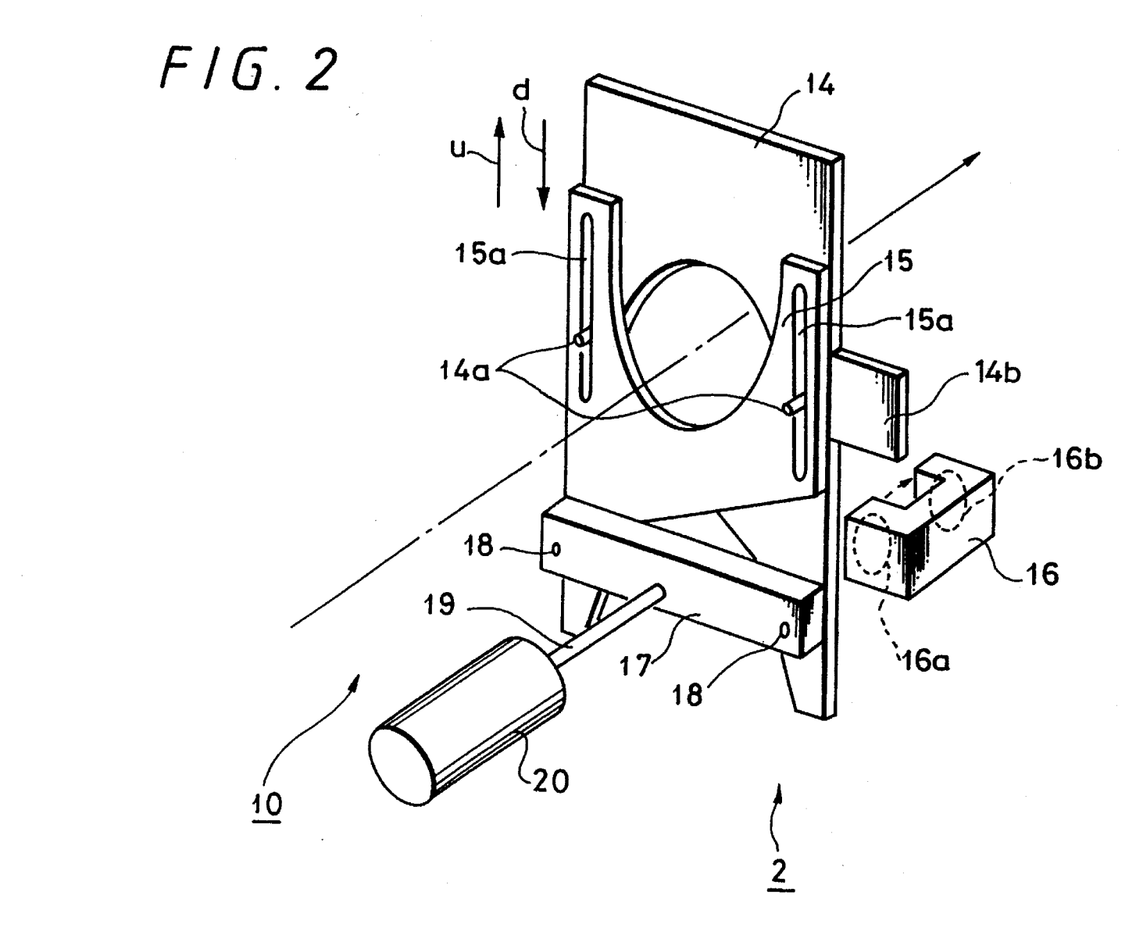
- FIG. 2 is a perspective view showing a main portion of the light amount control apparatus according to the embodiment of the present invention.

In FIG. 2, reference numeral 14 designates an upper blade. The upper blade 14 has an ellipsoidal recess formed on the lower portion and shafts 14a formed or attached thereto at its both side portions. Further, the upper blade 14 has a shielding plate 14b formed at a predetermined position of the right-hand side of the sheet of drawing.

In FIG. 2, reference numeral 15 depicts a lower blade. The lower blade 15 has an ellipsoidal recess formed on its upper portion. Slits 15a are formed on both side portions of the lower blade 15.

The shafts 14a formed on or attached to both sides of the upper blade 14 are movably attached to the slits 15a formed on both sides of the lower blade 15. A left end portion of an arm 17 is rotatably attached to the lower blade 15 at its lower right portion on the sheet of drawing by means of shafts 18. Further, the central portion of the arm 17 and a meter 20 are fixed by a shaft rod 19.

As shown in FIG. 2, at a lower predetermined position perpendicular to an extension line vertically extended from the shielding plate 14b, there is disposed a detector 16 (e.g., photo coupler, Hall element or the like) which comprises a light emitting portion 16a and a light sensing portion 16b which receives a light emitted from the light emitting portion 16a. The position at which the detector 16 is disposed is selected to be a position a little ahead of the position at which the diffraction phenomenon, for example, starts to occur. This detector 16 may be either a mechanical switch or optical switch.

When the iris 2 is opened by the iris driving unit 9 shown in FIG. 1, as shown in FIG. 2, the upper blade 14 is moved in the direction shown by an arrow u and the lower blade 15 is moved in the direction shown by an arrow d. At that time, the arm 17 attached to the upper and lower blades 14 and 15 are rotated in a counter-clock wise direction on the sheet of drawing. A rotation amount of the arm 17 is detected by the meter 20, and the detection signal is supplied through the A/D converter 13 to the microcomputer 11 shown in FIG. 1. The microcomputer 11 controls the shutter driving unit 8 on the basis of the detection signal supplied thereto from the meter 20 of the iris position detecting unit 10 through the A/D converter 13.

On the other hand, when the iris 2 is closed by the iris driving unit 9 shown in FIG. 1, as shown in FIG. 2, the upper blade 14 is moved in the direction shown by the arrow d and the lower blade 15 is moved in the direction shown by the arrow u. At that time, the arm 17 attached to the upper and lower blades 14 and 15 are rotated in a counter-clockwise direction on the sheet of drawing. Then, the rotation amount of the arm 17 is detected by the meter 20 and the detection signal is supplied through the A/D converter 13 to the microcomputer 11. The microcomputer 11 controls the shutter driving unit 8 on the basis of the detection signal supplied thereto from the meter 20 of the iris position detecting unit 10 through the A/D converter 13. Thus, a so-called electronic shutter operation speed can be varied.

When the shielding plate 14b of the upper blade 14 is entered into the concave portion of the detector 16, a light emitted from the light emitting portion 16a of the detector 16 is interrupted and is not supplied to the light sensing portion 16b. Thus, the microcomputer 11 detects that the iris 2 is located at the position a little ahead of the position at which the diffraction phenomenon will occur. Then, the microcomputer 11 controls the shutter driving unit 8 so that a so-called electronic shutter operation speed can be varied.

Figure 3:
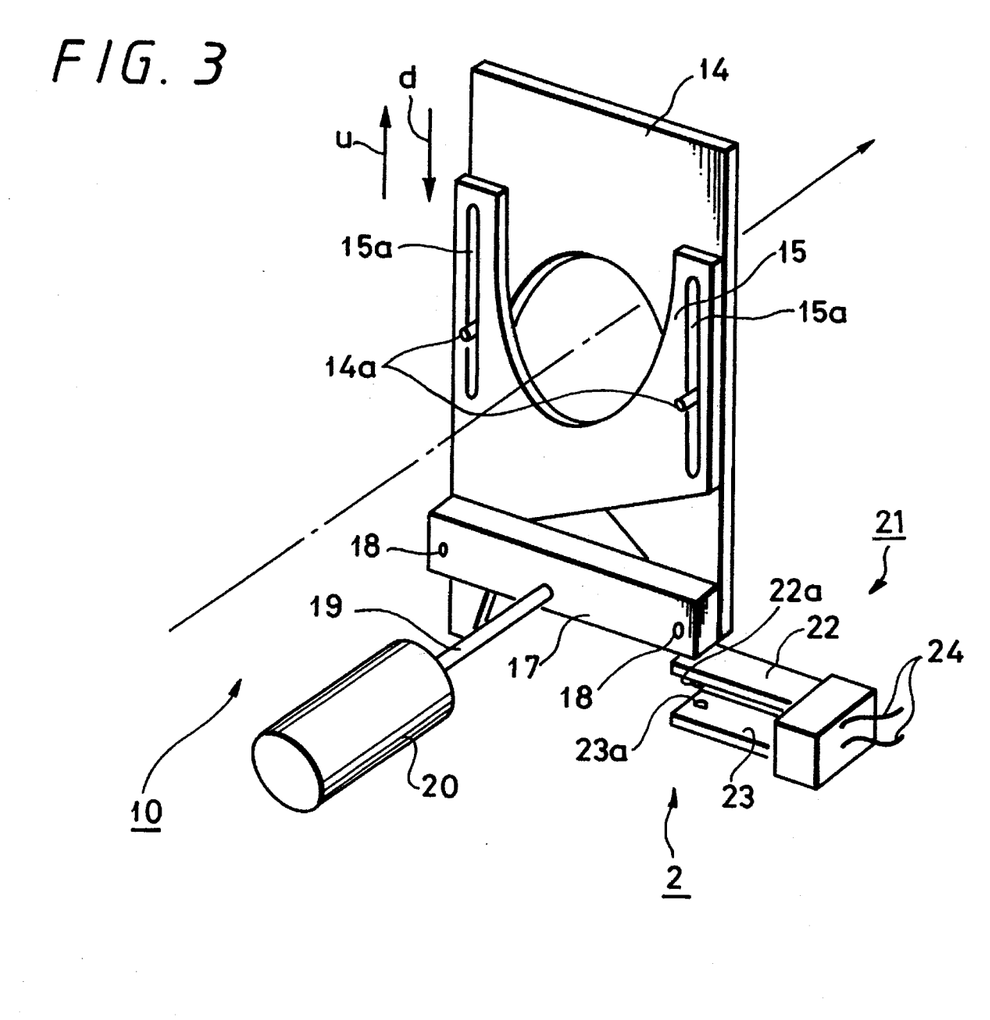
FIG. 3 is a perspective view showing other example of a main portion of the light amount control apparatus according to the embodiment of the present invention.

FIG. 3 shows other example of the structures of the iris 2 and the iris position detecting unit 10 shown in FIG. 2. This example will be described below.

In FIG. 3, reference numeral 14 designates an upper blade. The upper blade 14 has an ellipsoidal recess formed on the lower portion and shafts 14a formed or attached thereto at its both side portions. Further, the upper blade 14 has a shielding plate 14b formed at a predetermined position of the right-hand side of the sheet of drawing.

In FIG. 2, reference numeral 15 depicts a lower blade. The lower blade 15 has an ellipsoidal recess formed on its upper portion. Slits 15a are formed on both side portions of the lower blade 15.

The shafts 14a formed on or attached to both sides of the upper blade 14 are movably attached to the slits 15a formed on both sides of the lower blade 15. A left end portion of an arm 17 is rotatably attached to the lower blade 15 at its lower right portion on the sheet of drawing by means of shafts 18. Further, the central portion of the arm 17 and a meter 20 are fixed by a shaft rod 19.

As shown in FIG. 3, on the right-hand side of the sheet of the drawing of the arm 17, i.e., on the lower portion of the connected portion between the arm 17 and the lower blade 15, there is disposed a switch 21 which comes in contact with the arm 17 when the arm 17 is rotated in the clockwise direction on the sheet of drawing. The switch 21 (e.g., leaf switch or the like) generates an ON signal through a lead wire 24 when a contact 22a of a member 22 and a contact 23a of a member 23 are brought in contact with each other. Further, the position at which the switch 21 is turned on is selected to be the position a little ahead of the position at which the diffraction phenomenon starts to occur.

When the iris 2 is opened by the iris driving unit 9 shown in FIG. 1, as shown in FIG. 3, the upper blade 14 is moved in the direction shown by an arrow u and the lower blade 15 is moved in the opening direction shown by an arrow d. At that time, the arm 17 attached to the upper and lower blades 14 and 15 are rotated in a counter-clock wise direction on the sheet of drawing. A rotation amount of the arm 17 is detected by the meter 20, and the detection signal is supplied through the A/D converter 13 to the microcomputer 11 shown in FIG. 1. The microcomputer 11 controls the shutter driving unit 8 on the basis of the detection signal supplied thereto from the meter 20 of the iris position detecting unit 10 through the A/D converter 13.

On the other hand, when the iris 2 is closed by the iris driving unit 9 shown in FIG. 1, as shown in FIG. 3, the upper blade 14 is moved in the direction shown by the arrow d and the lower blade 15 is moved in the direction shown by the arrow u. At that time, the arm 17 attached to the upper and lower blades 14 and 15 are rotated in a counter-clockwise direction on the sheet of drawing. Then, the rotation amount of the arm 17 is detected by the meter 20 and the detection signal is supplied through the A/D converter 13 to the microcomputer 11. The microcomputer 11 controls the shutter driving unit 8 on the basis of the detection signal supplied thereto from the meter 20 of the iris position detecting unit 10 through the A/D converter 13. Thus, a so-called electronic shutter operation speed can be varied.

When the upper blade 14 is moved downwardly on the sheet of drawing as shown by the arrow d and the right end portion of the arm 17 pushes the member 22 of the switch 21 so that the contact 22a of the switch 21 and the contact 23a of the member 23 are brought in contact with each other, the switch 21 is turned on and thus, the microcomputer 11 shown in FIG. 1 detects that the iris 2 is located at the position a little ahead of the position at which the diffraction phenomenon will occur. Then, the microcomputer 11 controls the shutter driving unit 8 so that a so-called electronic shutter operation speed can be varied.

The reason that the microcomputer 11 controls the shutter driving unit 8 to thereby vary the so-called electronic shutter operation speed when the iris 2 is located at the position a little ahead of the position at which the diffraction phenomenon starts to occur in FIGS. 2 and 3 will be described. As earlier noted with reference to FIG. 1, the iris 2 is opened and closed in response to the level of the video signal so that, when the cameraman takes a picture of very bright scene, the iris 2 is closed considerably, i.e., utilized in the small aperture state. Then, the diffraction phenomenon occurs so that the resolution of the displayed picture is deteriorated. Therefore, when the aperture value of the iris 2 is brought to the position a little ahead of the position at which the diffraction phenomenon occurs, this is detected. Then, the electric charge accumulation time in the CCD element 3 is reduced by controlling the shutter driving unit 8, for example, and a sensitivity of the CCD element 3 relative to the video signal is lowered, thereby lowering the level of the video signal. Therefore, the iris 2 is automatically driven in the opening direction to thereby prevent the diffraction phenomenon from taking place.

Figure 5:
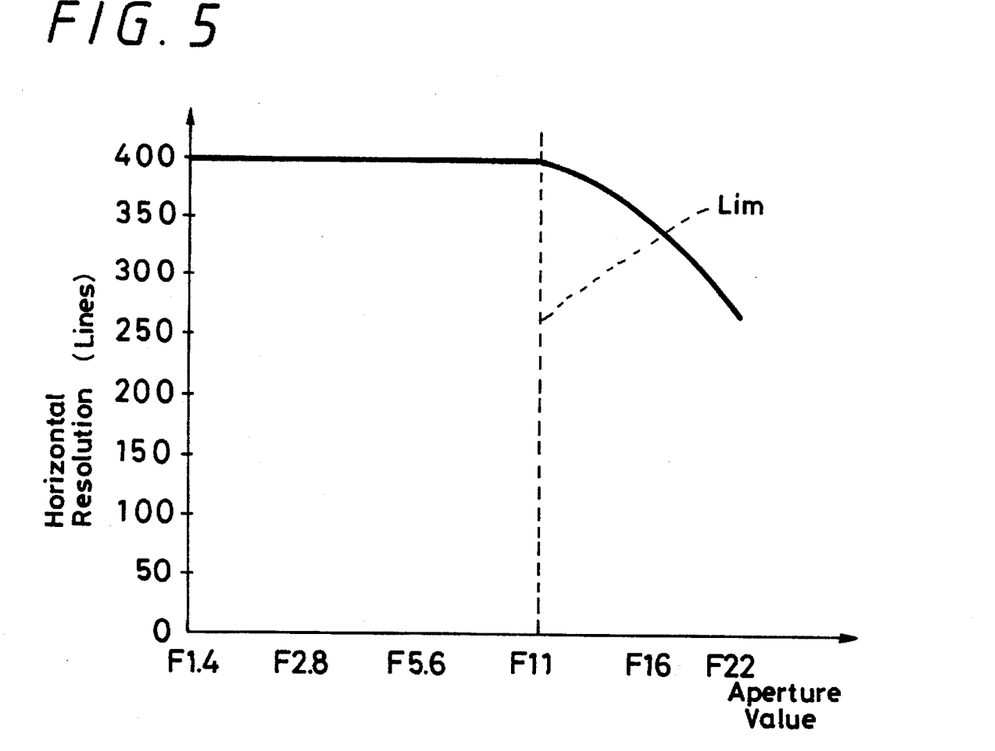
FIG. 5 is a graph used to explain the light amount control apparatus according to the embodiment of the present invention.

In this embodiment, an aperture value of the iris 2 in which the diffraction phenomenon occurs is set to F11 as shown in FIG. 5, for example. The aperture value, i.e., F11 of the iris 2 represents a limit at which a horizontal resolution starts being deteriorated as shown in FIG. 5.

The horizontal resolution is deteriorated by the small aperture of the iris 2 shown in FIG. 5 at different timings due to the different sizes (e.g., ½-inch, ⅓-inch, etc.) of CCD elements. That is, the smaller the size of the CCD element becomes, the smaller the mechanical size of the optical system becomes. Consequently, the iris 2 tends to be closed largely.

According to this embodiment, the positional information f the iris 2 provided before the occurrence of diffraction phenomenon is stored in advance in the ROM 21. When the iris 2 is closed to the small aperture position, the microcomputer 11 determines such condition and automatically allows the speed of the electronic shutter operation for the CCD element 3 to be increased progressively. As a result, the sensitivity of the CCD element 3 is relatively lowered, thereby opening the iris 2. When the iris 2 is opened more than the above small aperture position, the electronic shutter operation is progressively returned to the stationary state to thereby prevent the sensitivity of the CCD element 3 from being deteriorated. As will be described later, the count-up/ count-down step for the electronic shutter operation is carried out at the minimum unit, whereby the influence exerted upon the output of the CCD element 3, i.e., the picture quality of the video signal can be minimized.

Operation of the light amount control apparatus shown in FIG. 1 will be described with reference to a flowchart forming FIG. 4. A series of operation, which will be described below, is repeated at one vertical frequency, for example.

Figure 4:
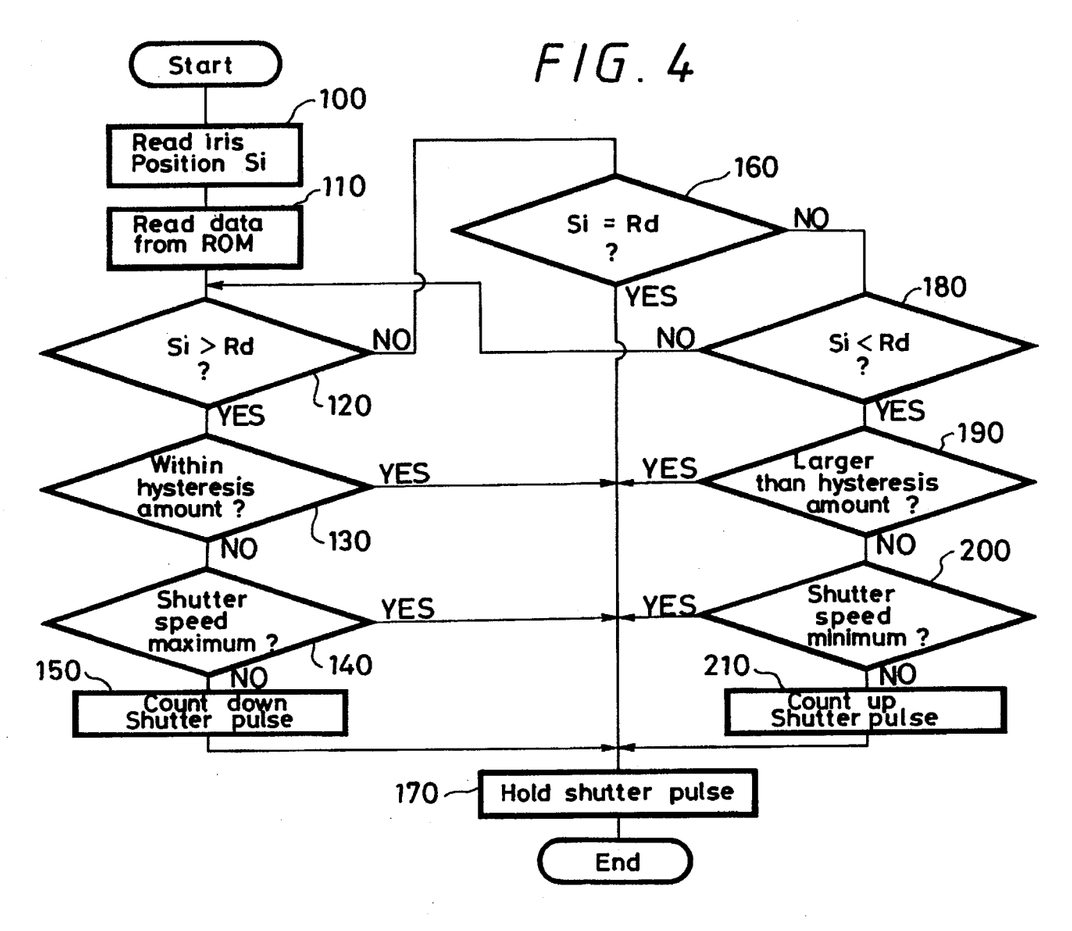
FIG. 4 is a flowchart to which references will be made in explaining operation of the light amount control apparatus according to the embodiment of the present invention.

Referring to FIG. 4, an iris position is read at step 100 and then the processing proceeds to step 110. That is, a position signal (obtained from the rotation amount) Si of the iris 2 supplied from the iris position detecting unit 10 through the A/D converter 13 shown in FIG. 1 is read out.

At step 110, data is read out from the ROM 12 and then the processing proceeds to decision step 120. That is, position data corresponding to the aperture value of the iris 2 a little before the diffraction phenomenon occurs is read out from the ROM 12 shown in FIG. 1.

It is determined in decision step 120 whether or not the position data Si of the iris 2 is larger than the reference position data Rd read out from the ROM 12. If a YES is output at decision step 120, then the processing proceeds to step 130. If a NO is output, then the processing proceeds to step 160.

It is determined in decision step 160 whether or not the judged result in step 120 falls within a hysteresis amount. If a YES is output at decision step 130, then the processing proceeds to step 170. If a NO is output, the processing proceeds to step 140. That is, it is determined in decision step 130 whether or not the absolute value of a difference between the position data Si obtained by the calculation in step 120 and the reference position data Rd is larger than a hysteresis amount.

It is determined in decision step 140 whether or not the shutter speed is maximum. If a YES is output at decision step 140, then the processing proceeds to step 200. If a NO is output, then the processing proceeds to step 150.

In step 150, a shutter pulse is counted down and then the processing proceeds to step 170. That is, a shutter speed represented by the control signal that controls the shutter driving unit 8 shown in FIG. 1 is increased.

If a NO is output at decision step 120, then the processing proceeds to decision step 160. It is determined in decision step 160 whether or not the position signal S2 and the reference position signal are equal to each other. If a YES is output, then the processing proceeds to step 170. If a NO is output, then the processing proceeds to step 180.

In step 170, the shutter pulse is held and the processing is ended. That is, the shutter speed represented by the control signal that controls the shutter driving unit 8 shown in FIG. 1 is held.

It is determined in decision step 180 whether or not the position signal Si is smaller than the reference position signal Rd. If a YES is output, then the processing proceeds to step 190. If a NO is output, the processing proceeds to step 120 one more time.

It is determined in decision step 190 whether the result at step 180 falls within the hysteresis amount. If a YES is output, then the processing proceeds to step 170. If a NO is output, the processing proceeds to step 200. That is, it is determined whether or not the absolute value of the difference between the position data Si obtained by the calculation in step 180 and the reference position data Rd is larger than the hysteresis amount.

It is determined in decision step 200 whether or not the shutter speed is minimum. If a YES is output, then the processing proceeds to step 170. If a NO is output, then the processing proceeds to step 210.

In step 210, the shutter pulse is counted up and then the processing proceeds to step 170. That is, the shutter speed represented by the control signal that controls the shutter driving unit 8 shown in FIG. 1 is increased.

As will be clear from the flowchart of FIG. 4, when the position signal Si supplied from the iris position detecting unit 10 through the A/D converter 13 is larger than the reference position signal (located a little ahead of the position at which the diffraction phenomenon occurs) read out from the ROM 12, it is further determined whether the difference therebetween falls within the hysteresis value. If the difference falls within the hysteresis value, the electric charge accumulation time in the CCD element 3 by the shutter driving unit 8 is held in the present state. If it does not fall within the hysteresis value and further the shutter speed (e.g., electric charge accumulation time in the CCD element 3) is not maximum, then the shutter speed is increased. Therefore, the oscillation of the auto-iris system and the up/down of the electronic shutter operation speed can be prevented.

If the position signal Si supplied from the iris position detecting unit 10 through the A/D converter 13 is equal to the reference position signal Rd read out from the ROM 12, then the electric charge accumulation time in the CCD element 3 by the shutter driving unit 8 is held in the present state.

If the position signal Si supplied from the iris position detecting unit 10 through the A/D converter 13 is smaller than the reference position signal Rd read out from the ROM 12, then it is determined whether or not the difference therebetween falls within the hysteresis value. If the difference falls within the hysteresis value, then the electric charge accumulation time in the CCD element 3 by the shutter driving unit 8 is held in the present state. If the difference does not fall within the hysteresis value and the shutter speed (e.g., electric charge accumulation time in the CCD element 3 is not minimum, then the shutter speed is lowered, thereby preventing the oscillation caused by the auto-iris system and the up/down of the electronic shutter operation speed.

If the position signal Si is larger than the reference position signal Rd, the difference therebetween is out of the hysteresis value and the shutter speed is maximum and if the position signal Si is smaller than the reference position signal Rd, the difference therebetween is out of the hysteresis value and the shutter speed is minimum, then the shutter speed is held.

A maximum speed of the electronic shutter operation is set to $\frac{1}{4}$-169 second according to the NTSC system and $\frac{1}{10040}$ second according to the PAL system.

However, if the shutter speed is high, the output component that is changed by counting up or counting down the shutter pulse vt "1" is increased, which frequently affects the picture quality of the video signal output from the CCD element 3. Therefore, it is preferable that the shutter speed is about $\frac{1}{250}$ second. Accordingly, if the count value of the maximum speed is stored in the ROM 12, a freedom can be increased.

The minimum speed of the electronic shutter speed is $\frac{1}{60}$ second according to the NTSC system and $\frac{1}{50}$ second according to the PAL system. However, in a video camera having a so-called slow shutter function, the minimum speed of the electronic shutter speed may become a set value.

While a series of operation is carried out at one vertical cycle, i.e., the shutter speed is changed by ±1 count during one vertical cycle as described above, as shown in FIG. 6, in response to the absolute value of the difference between the position signal Si supplied thereto from the iris position detecting unit 10 through the A/D converter 13 and the reference position signal Rd read out from the ROM 12, the count up or count down amount can be varied as "1", "2", "3", "4" during one vertical cycle.

Figure 6:
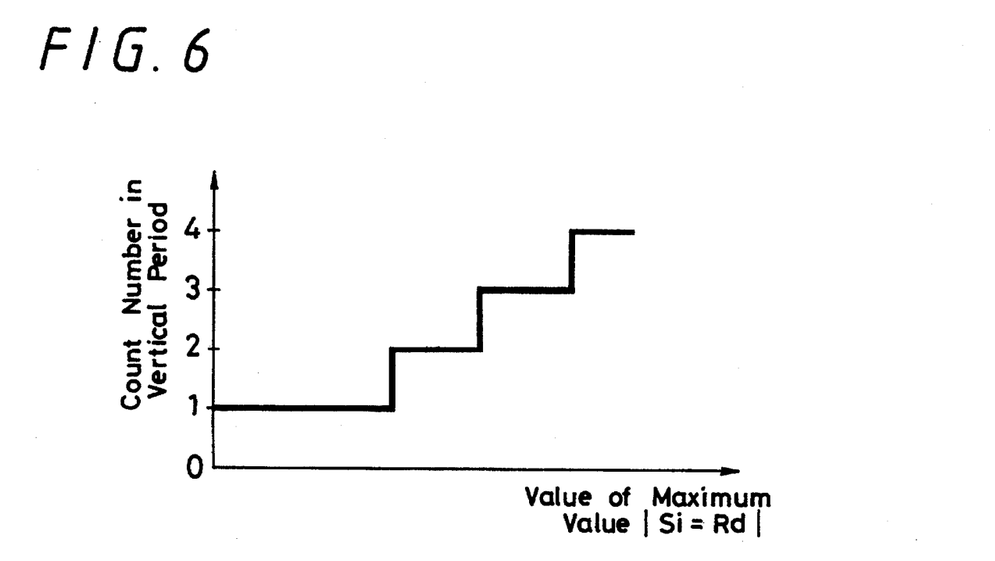
FIG. 6 is a graph used to explain the light amount control apparatus according to the embodiment of the present invention.

In this case, when the light amount is suddenly changed, the problem of such change of light amount can be solved by changing the count-up or count-down amount can be changed nonlinearly.

Such rapid change can be detected with ease by using the absolute value of the difference between the position signal Si and the reference position signal Rd or absolute value of difference between the value of the position signal Si of one vertical cycle before and the value of the position signal Si of one vertical cycle before and the reference position signal Rd. As described above, according to this embodiment, if the position of the iris 2, i.e., the aperture value is larger than the aperture value provided a little before the diffraction phenomenon occurs, the difference therebetween does not fall within the hysteresis value and the shutter speed is not maximum, the shutter pulse that is the control signal supplied to the shutter driving unit 8 is counted down to thereby increase the shutter speed.

If the position of the iris 2, i.e., the aperture value is larger than the aperture value provided a little before the diffraction phenomenon occurs, the difference therebetween does not fall within the hysteresis value and the shutter speed is maximum, the shutter pulse that is the control signal supplied to the shutter driving unit 8 is held to thereby hold the shutter speed.

If the position of the iris 2, i.e., the aperture value is larger than the aperture value provided a little before the diffraction phenomenon occurs and the difference therebetween falls within the hysteresis value, the shutter pulse that is the control signal supplied to the shutter driving unit 8 is held to thereby hold the shutter speed.

If the position of the iris 2, i.e., the aperture value is smaller than the aperture value provided a little before the diffraction phenomenon occurs, the difference therebetween does not fall within the hysteresis value and the shutter speed is not minimum, the shutter pulse that is the control signal supplied to the shutter driving unit 8 is counted up to thereby decrease the shutter speed.

If the position of the iris 2, i.e., the aperture value is smaller than the aperture value provided a little before the diffraction phenomenon occurs, the difference therebetween does not fall within the hysteresis value and the shutter speed is minimum, the shutter pulse that is the control signal supplied to the shutter driving unit 8 is held to thereby hold the shutter speed.

If the position of the iris 2, i.e., the aperture value is smaller than the aperture value provided a little before the diffraction phenomenon occurs and the difference therebetween falls within the hysteresis value, the shutter pulse that is the control signal supplied to the shutter driving unit 8 is held to thereby hold the shutter speed.

If the position of the iris 2, i.e., the aperture value is the same as the aperture value provided a little before the diffraction phenomenon occurs, the shutter pulse that is the control signal supplied to the shutter driving unit 8 is held to thereby hold the shutter speed. Accordingly, the interference exerted on the output video signal by the auto-iris system and the speed-up/speed-down of electronic shutter can be prevented. Further, when the cameraman takes a picture of bright scene, an optical diffraction phenomenon can be prevented and the shooting can be carried out in response to the aperture value of the iris. Therefore, the cameraman can always take a picture under satisfactory condition. Further, even when the light amount is increased after the iris 2 is located at the position a little ahead of the position at which the diffraction phenomenon occurs, as described above, the speed of the electronic shutter operation can be changed such that an oscillation can be prevented from being produced in the output of the CCD element 3. Also, in this case, the deterioration of the picture quality of the video signal can be suppressed to the minimum and a so-called overflow phenomenon can be prevented. Thus, the cameraman can take a picture satisfactorily.

Though not shown, according to a modified example of the present invention, the light amount control apparatus may include an ND filter and a driving unit for driving this ND filter. When the microcomputer 11 detects that the iris 2 is located at the position a little ahead of the position at which the diffraction phenomenon will occur, the microcomputer 11 control the ND filter driving unit and the ND filter is moved and located at the front surface portion of the CCD element 3 of the video camera. Thus, the sensitivity of the CCD element 3 is lowered and the iris 2 is opened.

In this case, as earlier noted with reference to the flow-chart of FIG. 4, a hysteresis value is set to be more than the change of iris position corresponding to the density of the ND filter. If the hysteresis value is set as described above, the oscillation of the output from the CCD element 3 can be prevented. Because, when the ND filter is attached to or detached from the video camera by the position of the iris 2, if there is not provided the hysteresis more than the changed amount of the iris position corresponding to the density of the ND filter, then the output of the CCD element 3 is oscillated.

While the image pickup element is merely described as the CCD element 3 as described above, the present invention is not limited thereto and can also be applied to any of a 1-chip image pickup element, a 2-chip image pickup element and a 3-chip image pickup element.

Alternatively, the speed of the electronic shutter operation may be changed in response to the light amount. Also, the position of the iris 2 in which the electronic shutter operation is started may be freely set by providing an EEPROM and writing means, for example, in response to lenses used.

According to the present invention, the aperture value of the iris can be prevented from exceeding a predetermined value after the aperture value of the iris detected by the detecting means became the predetermined value. When the cameraman takes a picture of a bright scene, for example, the optical diffraction phenomenon can be prevented and the satisfactory shooting can be carried out.

Further, according to the present invention, the shutter speed of the shutter means is made constant until the aperture value of the iris detected by the detecting means becomes a predetermined value. When the aperture value of the iris detected by the detecting means exceeds the predetermined value, the shutter speed of the shutter means is changed. Accordingly, the cameraman can take a picture in accordance with the aperture value of the iris. Thus, the optical diffraction phenomenon can be prevented and the cameraman can always take a picture under the satisfactory condition.

Having described a preferred embodiment of the invention with reference to the accompanying drawings, it is to be understood that the invention is not limited that precise embodiment and that various changes and modifications could be effected by one skilled in the art without departing from the spirit or scope of the invention as defined in the appended claims.

What is claimed is:

1. An apparatus for controlling an amount of light in an optical system comprising:

(a) a lens;

(b) an image pickup element;

(c) an iris operatively positioned between the image pickup element and the lens and configured for adjusting the amount of light transmitted from the lens to the image pickup element, by assuming different aperture values, said aperture values varying inversely relative to apertures assumed by the iris;

(d) first detector means operatively coupled to the iris for detecting an aperture value of the iris and for detecting closure of said iris to an aperture larger than an aperture at which a diffraction phenomenon occurs;

(e) electronic shutter means for controlling exposure of the image pickup element to the light transmitted from the lens to the image pickup element;

(f) second detector means for detecting the amount of light to which the image pickup element is exposed;

(g) shutter driving means operatively associated with the electronic shutter means for controlling an amount of time during which said image pickup element is exposed to said light (shutter speed);

(h) iris driving means operatively coupled to said iris and said second detector for directly driving said iris in response to the amount of light to which said image pickup unit (element) is exposed;

(i) a memory in which are stored data identifying the aperture value of said iris at which said diffraction phenomenon occurs;

(j) control means operatively coupled to said first detector means, said memory and said shutter driving means and configured for indirectly controlling said iris by controlling said electronic shutter means so that the aperture value of said iris can be prevented from being increased after reaching a value short of a value at which a diffraction phenomenon occurs, said control means being configured to compare the aperture value detected by the first detecting means with the data stored in the memory and controlling the shutter driving means in response to the comparison as well as a hysteresis range within which the iris and electronic shutter would otherwise be driven in oscillating fashion.

2. The apparatus of claim 1, wherein said control means is configured to maintain a constant shutter speed until the aperture value of said iris detected by said first detector means reaches a predetermined value and changes the shutter speed of said electronic shutter means when the aperture value of said iris detected by said first detector means exceeds said predetermined value.

3. The apparatus of claim 1, wherein said control means is configured to change the shutter speed of said electronic shutter means such that the shutter speed of the electronic shutter means is decreased when the shutter speed is not at a minimum when the aperture value of the iris is smaller than a predetermined value and such that the shutter speed is increased when the shutter speed is not a maximum when the aperture value of the iris is larger than said predetermined value.

4. A video camera apparatus comprising:
(a) a lens;
(b) an image pickup element;

(c) an iris operatively positioned between the image pickup element and the lens and configured for adjusting an amount of light from the lens to the image pickup element, by assuming different aperture values, said aperture values varying inversely relative to apertures assumed by the iris;

(d) first detector means operatively coupled to the iris for detecting an aperture value of the iris and for detecting closure of said iris to an aperture larger than an aperture at which a diffraction phenomenon occurs;

(e) electronic shutter means for controlling exposure of the image pickup element to the light transmitted from the lens to the image pickup element;

(f) second detector means for detecting the amount of light to which the image pickup element is exposed (shutter speed);

(g) shutter driving means operatively associated with the electronic shutter means for controlling an amount of time during which said image pickup element is exposed to said light;

(h) iris driving means operatively coupled to said iris and said second detector for directly driving said iris in response to the amount of light to which said image pickup element is exposed;

(i) a memory in which are stored data identifying the aperture value of said iris at which said diffraction phenomenon occurs; and (j) control means operatively coupled to said first detector means and said shutter driving means and configured for indirectly controlling said iris by controlling said electronic shutter means and said iris driving means so that the aperture value of said iris can be prevented from being increased after reaching a value short of a value at which a diffraction phenomenon occurs, said control means being configured to compare the aperture value detected by the first detecting means with the data stored in the memory and controlling the shutter driving means in response to the comparison as well as a hysteresis range within which the iris and electronic shutter would otherwise be driven in oscillating fashion.

5. The video camera apparatus of claim 4, wherein said control means is configured to maintain a constant shutter speed until the aperture value of said iris detected by said first detector means reaches a predetermined value and changes the shutter speed of said electronic shutter means when the aperture value of said iris detected by said first detector means exceeds said predetermined value.

6. The video camera apparatus of claim 4, wherein said control means is configured to allow said shutter driving means to change the shutter speed of said electronic shutter means such that the electronic shutter speed of the shutter means is decreased when the shutter speed is not at a minimum when the aperture value of the iris is smaller than a predetermined value and such that the shutter speed is increased when the shutter speed is not a maximum when the aperture value of the iris is larger than said predetermined value.

* * * * *